(12) United States Patent
Han et al.

(10) Patent No.: US 6,726,106 B1
(45) Date of Patent: Apr. 27, 2004

(54) POWER MANAGEMENT AND DEVICE ILLUMINATION MECHANISMS FOR A PERSONAL DIGITAL ASSISTANT

(75) Inventors: Amy A. Han, Palo Alto, CA (US); Paul J. Lima, San Jose, CA (US)

(73) Assignee: Good Technology, Inc., Sunnyvale, CA (US)

( * ) Notice: Subject to any disclaimer, the term of this patent is extended or adjusted under 35 U.S.C. 154(b) by 0 days.

(21) Appl. No.: 10/114,548

(22) Filed: Apr. 2, 2002

(51) Int. Cl.[7] ................................................. G06K 7/10
(52) U.S. Cl. .................... 235/472.01; 345/102; 349/199
(58) Field of Search .................... 235/472.01; 361/681; 455/566; 345/102, 169, 30; 200/314; 349/69, 199; 362/84

(56) References Cited

U.S. PATENT DOCUMENTS

| | | | | |
|---|---|---|---|---|
| 4,969,508 A | * | 11/1990 | Tate et al. ................... | 165/209 |
| 5,105,186 A | * | 4/1992 | May ............................ | 345/175 |
| 5,135,095 A | * | 8/1992 | Kocznar et al. ............ | 194/209 |
| 5,341,133 A | * | 8/1994 | Savoy et al. ................ | 341/22 |
| 5,515,080 A | * | 5/1996 | Nakamura et al. .......... | 345/534 |
| 5,532,473 A | * | 7/1996 | Chin .................... | 250/214 PR |
| 5,797,482 A | * | 8/1998 | LaPointe et al. ............ | 200/314 |
| 5,901,834 A | * | 5/1999 | Inubushi et al. ............. | 200/314 |
| 6,097,964 A | * | 8/2000 | Nuovo et al. ................ | 455/566 |
| 6,144,550 A | * | 11/2000 | Weber et al. ................ | 361/681 |
| 6,191,939 B1 | * | 2/2001 | Burnett ........................ | 361/681 |
| 6,198,060 B1 | * | 3/2001 | Yamazaki et al. .......... | 200/305 |
| 6,219,021 B1 | * | 4/2001 | Izumi .......................... | 345/102 |
| 6,322,229 B1 | * | 11/2001 | Chan et al. ................... | 362/85 |
| 6,369,801 B2 | * | 4/2002 | Boireau et al. ............. | 345/169 |
| 6,446,076 B1 | * | 9/2002 | Burkey et al. .............. | 707/102 |
| 6,553,222 B1 | * | 4/2003 | Weiss .......................... | 455/415 |

* cited by examiner

*Primary Examiner*—Diane I. Lee
*Assistant Examiner*—Kumiko C. Koyama
(74) *Attorney, Agent, or Firm*—Blakely Sokoloff Taylor & Zafman LLP

(57) ABSTRACT

According to one embodiment, a handheld device is disclosed. The handheld device includes a housing, a display mounted within the housing, and a light sensor mounted within the housing to detect light beams through the display. In a further embodiment, the handheld device includes a plurality of keypads mounted on the housing, and an electro luminescent (EL) sheet. The EL sheet is mounted within the housing below the display and the keypads, and illuminates the display and keypads whenever the handheld device is in a dark environment. In yet another embodiment, the handheld device includes a thumbwheel. The EL sheet or an LED illuminates the thumbwheel whenever the handheld device is in a dark environment.

14 Claims, 3 Drawing Sheets

POWER MANAGEMENT AND DEVICE ILLUMINATION MECHANISMS FOR A PERSONAL DIGITAL ASSISTANT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to the field of personal digital assistants; more particularly, the present invention relates to a personal digital assistant having a power management mechanism.

BACKGROUND

The popularity and use of Personal Digital Assistants (PDAs) has increased in recent years. A PDA or hand-held computer is primarily a lightweight, compact productivity and communications tool that can typically be held in one hand, leaving the other hand free to input data with a pen type stylus or a reduced size keyboard.

A PDA provides computing and information storage and retrieval capabilities for personal or business use. Typical uses include schedule and address book storage and retrieval, as well as note taking functions. In addition, many PDAs are capable of running a variety of application software packages (e.g., calculators, text and/or image editors, etc.). Moreover, many existing PDAs offer the ability to wirelessly transmit and receive electronic-mail (e-mail) messages, calendar events, contact lists, etc.

The problems of power consumption in PDAs has become of greater concern as ever-greater computing power is housed in ever-smaller PDA enclosures. In battery-powered computers (e.g., a PDA, pager, etc.), power conservation is required to increase battery life and thereby increase the period of time that the PDA can be used prior to recharging or replacing the batteries.

One power conservation method for PDAs is to use a belt clip with a magnet attached to the clip. The PDA includes a Reed switch that is located so that it will sense the magnet whenever the PDA is placed into the clip. Once the PDA is placed into the clip, the Reed switch detects the magnet. As a result, the PDA enters a sleep mode wherein power is conserved.

The problem is that if the user does not have a clip, there is no way to conserve power without completely turning off the PDA. For example, a user may have a PDA in a bag or purse, without turning the power off. While the PDA is in the bag, power is being wasted since there is no intention by the user of the PDA being immediately used. Therefore, a PDA with improved power management is desired.

SUMMARY

According to one embodiment, a handheld device is disclosed. The handheld device includes a housing, a display mounted within the housing, a light sensor mounted with an LED under a light pipe, and a light sensor mounted within the housing to detect light beams though the display. In one embodiment, the light sensor is coupled to a power management unit that causes the handheld device to go into a sleep state whenever no light beams are detected at the light sensor. In a further embodiment, the handheld device includes an electro luminescent (EL) sheet mounted within the housing that provides lighting for the display and the keypads. In yet a further embodiment, the EL sheet is automatically activated whenever the handheld device is being operated in a dark environment.

THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A power management mechanism for a personal digital assistant is described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
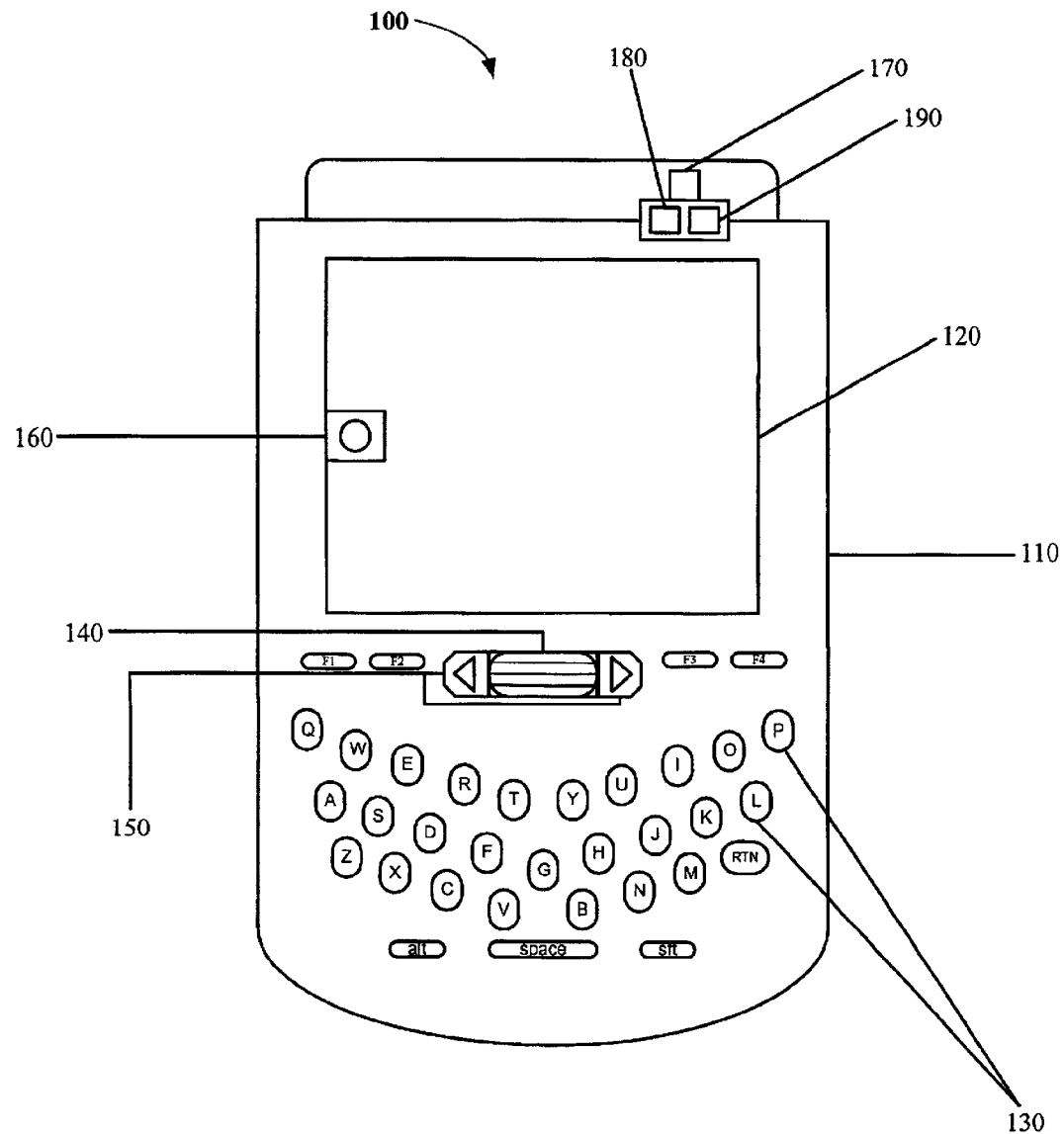
FIG. 1 illustrates a frontal view of one embodiment of a handheld device.

FIG. 1 illustrates a frontal view of one embodiment of a handheld device 100. According to one embodiment, handheld device 100 is a wireless handheld device. In another embodiment, device 100 is a personal digital assistant (PDA). In yet another embodiment, handheld device 100 is a two-way pager. In another embodiment, handheld device 100 may be a wireless electronic mail (e-mail), calendar and contact list device.

Handheld device 100 includes a housing 110, display 120, keyboard 130, navigation wheel 140, navigation buttons 150, light sensor 160, light pipe 170 and light sensor 180. Housing 110 encloses a printed circuit board that includes various electronic components mounted thereon. In one embodiment, housing 110 is an elongated structure that fits in the palm of a device 100 user.

In a further embodiment, housing 110 is comprised of aluminum and plastic and has a length of 99.6 mm, a width of 72.5 mm, and a depth of 16 mm. Nevertheless, one of ordinary skill in the art will appreciate that housing 110 may include other materials and dimensions without departing from the scope of the invention.

Display 120 is mounted within housing 110. Display 120 is a projecting mechanism that shows text and graphic images to a device 100 user. In one embodiment, display 120 is implemented with a liquid crystal display (LCD). In yet a further embodiment, the LCD is a reflective-transmissive LCD (e.g., 30% transmissive and 70% reflective). However, one of ordinary skill in the art will appreciate that other image projection technology.

Keyboard 130 is mounted on housing 110, and is the primary text input device for device 100. Keyboard includes the standard arrangement of alphabetic keys (e.g., the QWERTY keyboard). Also, in one embodiment, keyboard 230 includes function keys F1–F4. In a further embodiment, function keys F1–F4 may implement standard function keys, such as the Escape key, a Home key, Menu key, Delete key, Shift and Alt keys. According to one embodiment, keyboard 130 has an upward slant, center spine configuration.

The upward slant configuration enables a user to easily access all of the keys on keyboard 130 with minimal hand movement. For example, a user may easily make a transition from a key in the middle of keyboard 130 (e.g., the Y key) to a key on the outside of keyboard 130 (e.g., the P key) with natural thumb movement. In addition, keyboard 130 has backlighting that enables a user of handheld device 100 to view the keys of keyboard 130 in dark or dim lighting.

Currently, wireless telephone devices include light emitting diodes (LEDs) that light the keyboard keys of the devices. However, since each LED draws up to 15–20 mW of power, and a handheld device 100 may include many more keys than implemented at a wireless telephone, the LED solution is impractical for handheld device 100.

According to one embodiment, handheld device 100 includes an electro luminescent (EL) sheet that lights the keys of keyboard 130, in addition to display 120. An EL sheet is a thin layer of light emitting phosphor placed between two thin electrodes. One of the electrodes is opaque and the other is translucent to allow light to escape. When alternating current (AC) is applied, the phosphor will rapidly charge and discharge, resulting in the emission of light.

Figure 2:
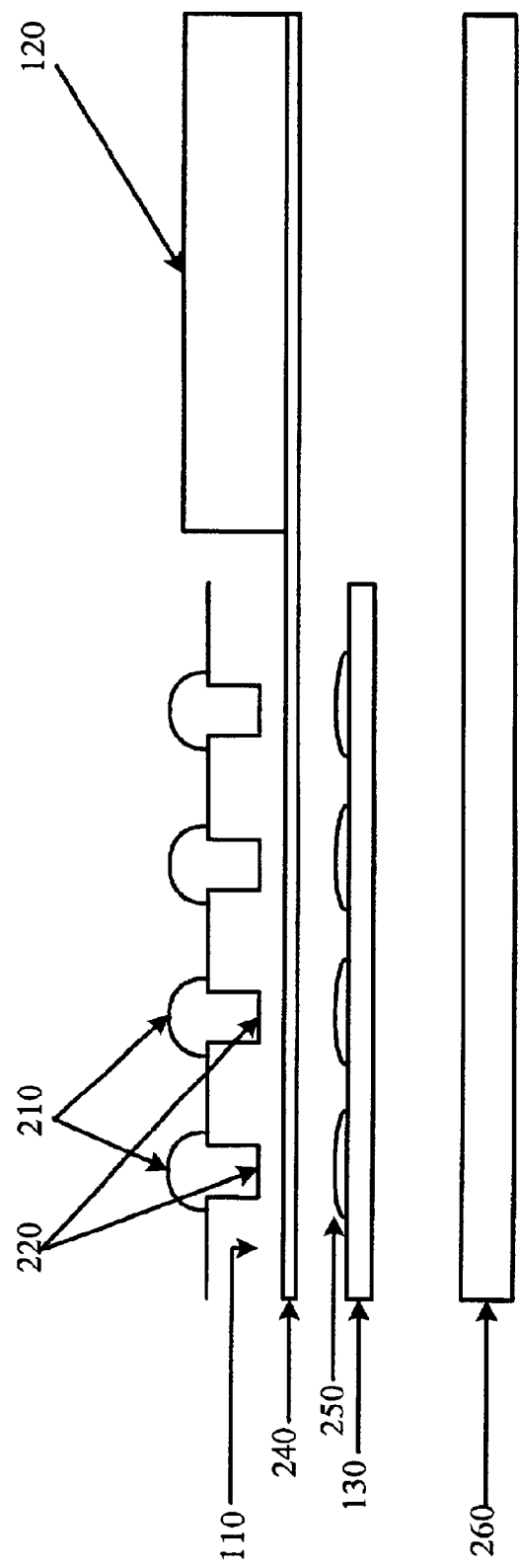
FIG. 2 illustrates an exploded cross-section view of one embodiment of handheld device.

FIG. 2 illustrates an exploded cross-section view of one embodiment of handheld device 100. Handheld device includes housing 110, display 120, keypads 210, key plungers 220, EL sheet 240, snap domes 250, keyboard 130 and printed circuit board (PCB) 260. Keypads 210 provide an interface of keyboard 130 for a user of device 100 to input data.

In one embodiment, keypads 210 are translucent to enable light emitted from EL sheet 240 to be visible. Keypads 210 are coupled to key plungers 220. Key plungers 220 are enclosed within housing 110. Whenever a user depresses a keypad 210, the respective key plunger 220 depresses a snap dome 250. In turn, the snap dome 250 makes an electrical connection at keyboard 130 that is transmitted to PCB 260.

As shown in FIG. 2, EL sheet 240 extends from the top of display 120 to beyond the last row of keypads 210. According to one embodiment, EL sheet 240 is activated (e.g., begins to emit light) whenever a keypad 210 is depressed. In such an embodiment, EL sheet 240 is activated by depressing and holding down a key. In yet another embodiment, EL sheet 240 is automatically activated whenever a user is operating handheld device 100 and no light is detected by light sensor 160.

Referring back to FIG. 1, thumbwheel 140 is mounted on housing 110. Thumbwheel 140 registers movement by a user by measuring the number of rotary clicks traversed while rolling the wheel. In one embodiment, thumbwheel 140 also registers as an input the depression or "clicking" of the wheel, which is performed by pressing the wheel toward the back of device 100.

According to one embodiment, thumbwheel 140 is translucent to enable illumination by EL sheet 240. In another embodiment, thumbwheel 140 may be illuminated by an LED mounted directly below thumbwheel 140. In either embodiment, thumbwheel 140 is constructed of a translucent plastic that enables user navigation in the dark.

The clicking of the wheel is similar to the clicking of a mouse associated with a PC or any other input device that registers the depression of a button. In a further embodiment, thumbwheel 140 rolls in a vertical direction on device 100 so that the user can easily move a thumb from the thumbwheel 140 to keyboard 130 and back for performing functions and retrieving data.

Navigation buttons 150 are also integrated on housing 110 on either side of thumbwheel 140. Navigation buttons 150 also register as an input the depression or "clicking" of each button 150 toward the back of device 100 by a user. The function of clicking buttons 150 is also similar to the clicking the buttons of a mouse associated with a PC or any other input device that registers the depression of a button. According to one embodiment, navigation buttons 150 are translucent to enable illumination by EL sheet 240.

Light sensor 160 is mounted within housing 110 underneath display 120. Light sensor 160 senses light beams through the transmissive portions of display 120. In one embodiment, light sensor 160 is mounted below display 120 in such a manner that no visible opening may be seen through display 120.

In another embodiment, light pipe 170 is mounted at the top of handheld device 100. Light pipe 170 naturally directs light outward for a notification LED 190. A second light sensor 180 is mounted below light pipe 170. Light pipe 170 also enables light to light sensor 180. When a user is in a dark environment, the brightness level drops to trigger light sensor 180. A signal is transmitted to the power management system to disable display 120.

According to one embodiment, sensors 160 and 180 are photomicrosensors embedded on an integrated circuit. In another embodiment, sensor 160 and sensor 180 transmits a high logic level (e.g., logic 1) whenever no light source is detected. Conversely, a low logic level (e.g., logic 0) is transmitted whenever sensor 160 and sensor 180 detect a light source.

In a further embodiment, light sensor 160 is coupled to a power management unit. The power management unit enables handheld device 100 to enter a sleep state whenever device 100 is located in an area with no light (e.g., a bag, purse, etc.). In the sleep state, display 120 is disabled, and consumes little to no power. Consequently, the batteries of device 100 are conserved during the sleep state.

Figure 3:
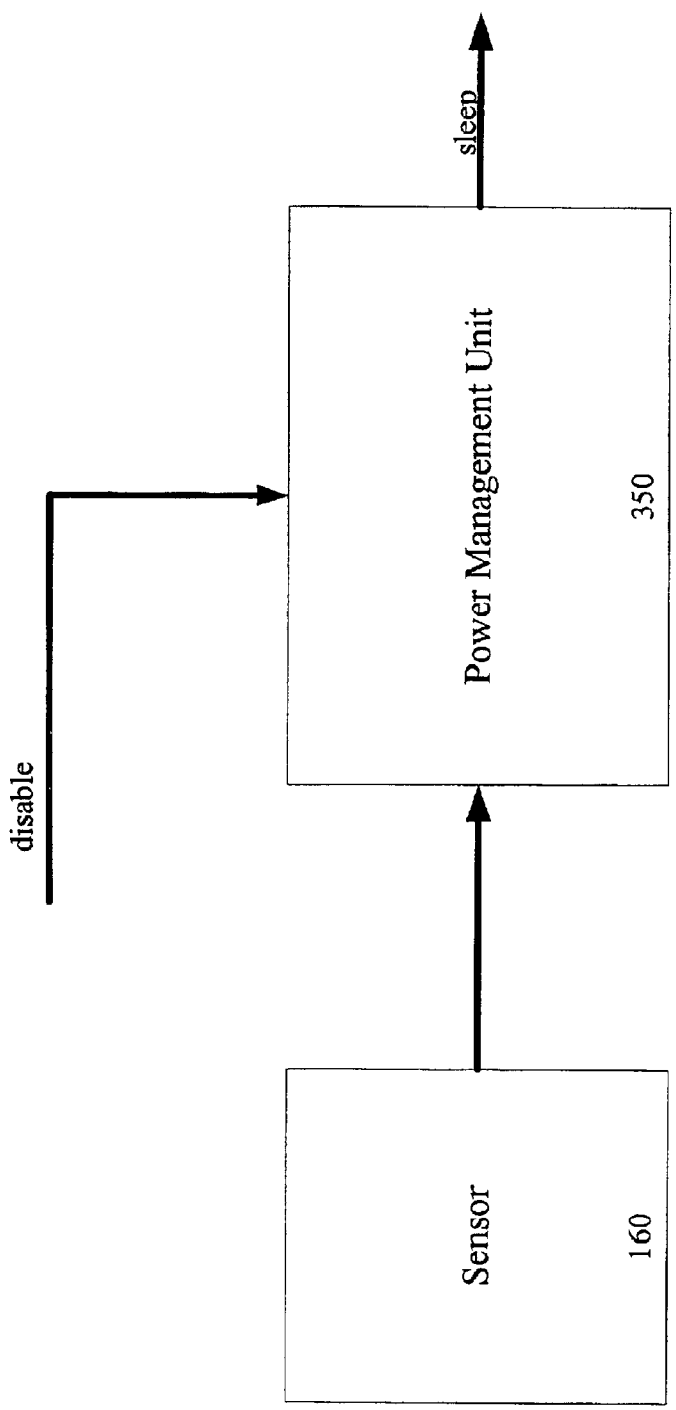
FIG. 3 is a block diagram of one embodiment of a power management unit.

FIG. 3 is a block diagram of one embodiment of a light sensor 160 coupled to a power management unit 350. As described above, sensor 160 transmits a high logic level whenever no light source is detected. Therefore, power management unit 350 is activated whenever handheld device 100 is located in an area with no light.

In response to being activated, power management unit 350 transmits a sleep signal to other components within handheld device 100 indicating that the components are to enter a sleep state, effectively shutting down the operation of device 100. Upon sensing a light source, sensor 160 transmits the low logic level, which causes power management unit 350 to be de-activated. Consequently, handheld device 100 exits the sleep state.

In one embodiment, power management unit 350 is programmable to enable a device 100 user to disable the power management feature of device 100. For instance, power management unit 350 receives a disable signal. Whenever the disable signal is activated, power management unit 350 is precluded from causing handheld device 100 to enter the sleep state. If the disable signal is de-activated, handheld device 100 is permitted to enter the sleep state whenever sensor 160 does not detect light.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A handheld device comprising:

a housing;

a display mounted within the housing;

a first light sensor mounted within the housing to detect light beams though the display;

a plurality of keypads mounted on the housing; and an electro luminescent (EL) sheet, mounted within the housing below the display and the keypads, that provides lighting for the display and the keypads;

wherein the handheld device goes into a sleep state whenever no light beams are detected at the first light sensor and the user is not operating the handheld device and the EL sheet is illuminated whenever no light beams are detected at the first light sensor and the user is operating the handheld device.

2. The handheld device of claim 1 wherein the EL sheet emits light whenever one of the plurality of keypads is depressed.

3. The handheld device of claim 2 further comprising key plungers attached to each of the plurality of keypads.

4. The handheld device of claim 3 wherein a key plunger contacts the EL sheet whenever an associated keypad is depressed.

5. The handheld device of claim 3 further comprising:

a plurality of snap domes, mounted below the EL sheet, corresponding to each of the plurality of key plungers; and a keyboard mounted to the plurality of snap domes.

6. The handheld device of claim 5 wherein the light emitted by the EL sheet illuminates the keyboard whenever the handheld device is in a dark environment.

7. The handheld device of claim 5 wherein a key plunger contacts a snap dome through the EL sheet whenever a keypad is depressed.

8. The handheld device of claim 5 further comprising a printed circuit board (PCB) mounted below the keyboard.

9. The handheld device of claim 8 wherein the PCB includes an electronic circuit, coupled to the keyboard, that activates the EL sheet whenever a key plunger depresses a snap dome.

10. The handheld device of claim 2 further comprising:

a thunbwheel mounted on the housing;

a first button mounted on the housing next to the left side of the thumbwheel; and a second button mounted on the housing next to the right side of the thumbwheel.

11. The handheld device of claim 10 wherein the light emitted by the EL sheet illuminates the thumbwheel whenever the handheld device is in a dark environment.

12. The handheld device of claim 1 wherein the handheld device is a personal digital assistant (PDA).

13. The handheld device of claim 1 wherein the handheld device is a two-way pager.

14. The handheld device of claim 1 wherein the handheld device is wireless electronic mail (e-mail), calendar and contact list device.

\* \* \* \* \*